United States Patent
Kanevsky et al.

(10) Patent No.: US 6,484,136 B1
(45) Date of Patent: Nov. 19, 2002

(54) LANGUAGE MODEL ADAPTATION VIA NETWORK OF SIMILAR USERS

(75) Inventors: Dimitri Kanevsky, Ossining, NY (US); Catherine G. Wolf, Katonah, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,383

(22) Filed: Oct. 21, 1999

(51) Int. Cl.[7] .......................... G06F 17/27; G10L 15/00
(52) U.S. Cl. ............................................ 704/9; 704/255
(58) Field of Search .......................... 704/1, 9, 10, 255, 704/257, 275, 277

(56) References Cited

U.S. PATENT DOCUMENTS

| | | | |
|---|---|---|---|
| 5,426,583 A | * 6/1995 | Mendibil ........................ | 704/2 |
| 5,444,617 A | * 8/1995 | Merialdo ........................ | 704/9 |
| 5,510,981 A | * 4/1996 | Berger et al. .................. | 704/2 |
| 5,659,765 A | * 8/1997 | Nii .............................. | 704/4 |
| 5,664,058 A | * 9/1997 | Vysotsky ...................... | 704/238 |
| 5,768,603 A | * 6/1998 | Brown et al. .................. | 704/9 |
| 5,897,616 A | * 4/1999 | Kanevsky et al. ............. | 379/88.02 |
| 5,907,821 A | * 5/1999 | Kaji et al. ...................... | 704/4 |
| 5,950,157 A | * 9/1999 | Heck et al. .................... | 704/234 |
| 6,088,669 A | * 7/2000 | Maes ............................ | 704/231 |
| 6,161,083 A | * 12/2000 | Franz et al. .................... | 704/4 |
| 6,163,769 A | * 12/2000 | Acero et al. .................... | 704/243 |
| 6,182,038 B1 | * 1/2001 | Balakrishnan et al. ...... | 704/250 |
| 6,253,179 B1 | * 6/2001 | Beigi et al. ................... | 704/243 |

* cited by examiner

Primary Examiner—Patrick N. Edouard
(74) Attorney, Agent, or Firm—Louis J. Percello; Charles W. Peterson, Jr.

(57) ABSTRACT

A language recognition system, method and program product for recognizing language based input from computer users on a network of connected computers. Each computer includes at least one user based language model trained for a corresponding user for automatic speech recognition, handwriting recognition, machine translation, gesture recognition or other similar actions that require interpretation of user activities. Network computer users are clustered into classes of similar users according to user similarities such as, nationality, profession, sex, age, etc. User characteristics are collected by sensors and from databases and, then, distributed over the network during user activities. Language models with similarities among similar users on the network are identified. The language models include a language model domain, with similar language models being clustered according to their domains. Language models identified as similar are modified in response to user production activities. After modification of one language model, other identified similar language models are compared and adapted. Also, user data, including information about user activities and language model data, is transmitted over the network to other similar users. Language models are adapted only in response to similar user activities, when these activities are recorded and transmitted over the network. Language models are given a global context based on similar users that are connected together over the network.

35 Claims, 5 Drawing Sheets

LANGUAGE MODEL ADAPTATION VIA NETWORK OF SIMILAR USERS

BACKGROUND OF THE INVENTION

1. Field of the Invention

The present invention is related to language recognition and more particularly to language recognition by multiple connected computer systems connected together over a network.

2. Background Description

Speech recognition systems for voice dictation, typically, try to improve word recognition accuracy by using what is referred to, normally, as a "local context" for word recognition. Local context based word recognition uses n preceding and m succeeding words, normally referred to as "n-tuples," to identify a particular spoken word. The local context recognition model selects the most likely word based on the statistical probability of the specific n-tuples. However, these prior speech recognition systems still make inappropriate recognition errors because they lack global context for the spoken words.

For example in dictating a review of a conference paper, prior art speech recognition systems have recognized "in terms of validity" as "in terms of the lead Dave." "Validity" has a global context because it is commonly discussed in conference paper reviews. However, "the lead Dave" is nonsensical in this context and so, has no global context.

Thus, there is a need for improved methods and systems for language recognition.

SUMMARY OF THE INVENTION

It is a purpose of the invention to improve language recognition by computers;

It is yet another purpose of the invention to expand the context base for language recognition.

The present invention is a language recognition system, method and program product for recognizing language based input from computer users connected together over a network of computers. Each computer includes at least one user based language model trained for a corresponding user. The language models may be used by users in automatic speech recognition, handwriting recognition, machine translation, gesture recognition or other similar actions that require interpretation of user activities. Computer users on a network of computers are clustered into classes of similar users. Users that are connected over the network are clustered according to their characteristic similarities such as, nationality, profession, sex, age, or any other characteristics that may influence user language model selection. Characteristics of users are collected by sensors and from databases and, then, distributed over the network during user activities. Language models with similarities among similar users on the network are identified.

The language models include a language model domain, with similar language models being clustered according to their domains. Language models identified as similar are modified in response to user production activities. After modification of one language model, other identified similar language models are compared and adapted. Also, user data, including information about user activities and user language model data, is transmitted over the network to other similar users. Language models are adapted only in response to similar user activities, when these activities are recorded and transmitted over the network. Language models are given a global context based on similar users that are connected together over the network.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
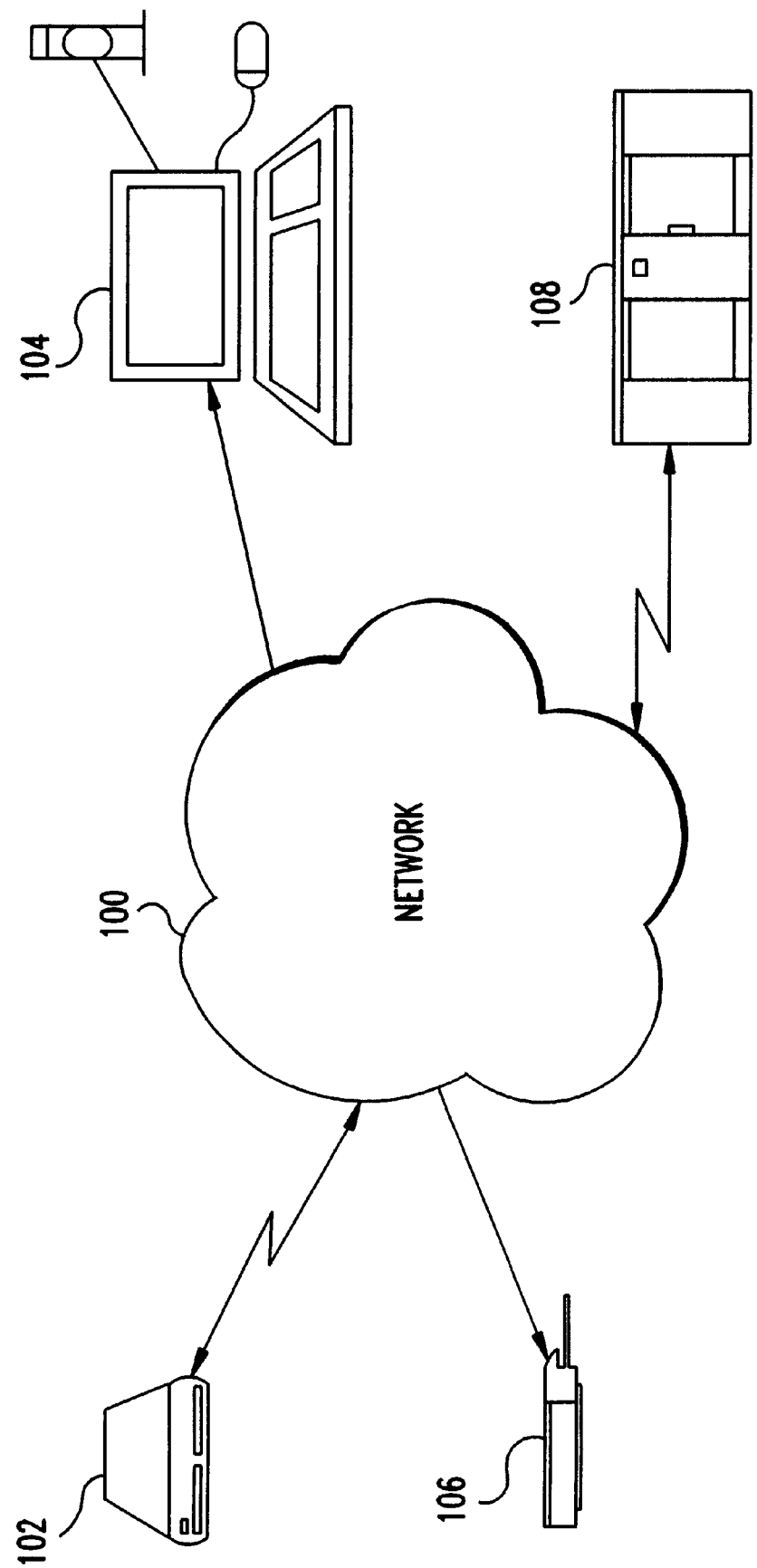
FIG. 1 is a block diagram of an example of a preferred embodiment language recognition network wherein users that are connected over the network cooperatively pool similar language models during production activities.

Referring now to the drawings and, more particularly, FIG. 1 shows an example of a language recognition network 100 of connected computers 102, 104, 106. Other computers may be connected to the network, but not participating in the language recognition system of the present invention and so are not shown nor discussed. Each computer 102, 104, 106 is capable of executing a language model (LM) for some type of language recognition. The language recognition network 100 may be a local area network (LAN), a wide area network (WAN), what is commonly referred to as the internet or the world wide web (www), what is commonly referred to as an intranet or, what is referred to as an extranet. In this example, the connected computers 102, 104, 106 may include an LM such that the particular computer 102, 104, 106 is an automatic speech recognition system, a handwriting recognition system, a machine translation language translator or interpreter (i.e., Greek to French system), a gesture recognition system or, any other system for recognizing symbols or actions that may require interpretation of user activities. The network 100 may include one or more servers 108.

Further, when the network 100 includes at least two servers 108, one server 108 may be a local server and the other server 108 may be a global server. A global database with all LM related documents is maintained on a global server 108. Thus, the global database may include multiple language models, individual user data and previously recognized document information. A local server, if included on the network 100, would maintain a local database with a description what is located and performed on local computers and one or more global servers.

According to the preferred embodiment of the present invention, the connected computers 102, 104, 106 act cooperatively in any particular language recognition task instead of acting independently. When one connected computer 102, 104, 106, adapts its particular individual language model, all connected computers 102, 104, 106 collectively adapt their corresponding language models according to user similarities. Thus, the language recognition resources of the entire network 100 are at the disposal of every user.

The network 100 of computers may include hand held computers 102, such as what is commonly referred to as a personal digital assistant (PDA); personal computers 104; and/or special purpose computers 106 or embedded processors, such as a computer adapted as a document scanner. One computer, hand held computer 102 for example, may include handwriting recognition software. One computer, personal computer 104 for example, may be equipped for automatic speech recognition (ASR) and include a local database with user specific language models and corresponding user related personal documents for one or more particular user. Thus, in the present example the personal computer 104 could include a microphone for speech input with error corrections made using the computer's mouse and keyboard. Gesture recognition would require some type of video input, e.g., a camera. A document scanning and recognition system 106 may also include and maintain a local database of previously scanned documents.

Figure 2:
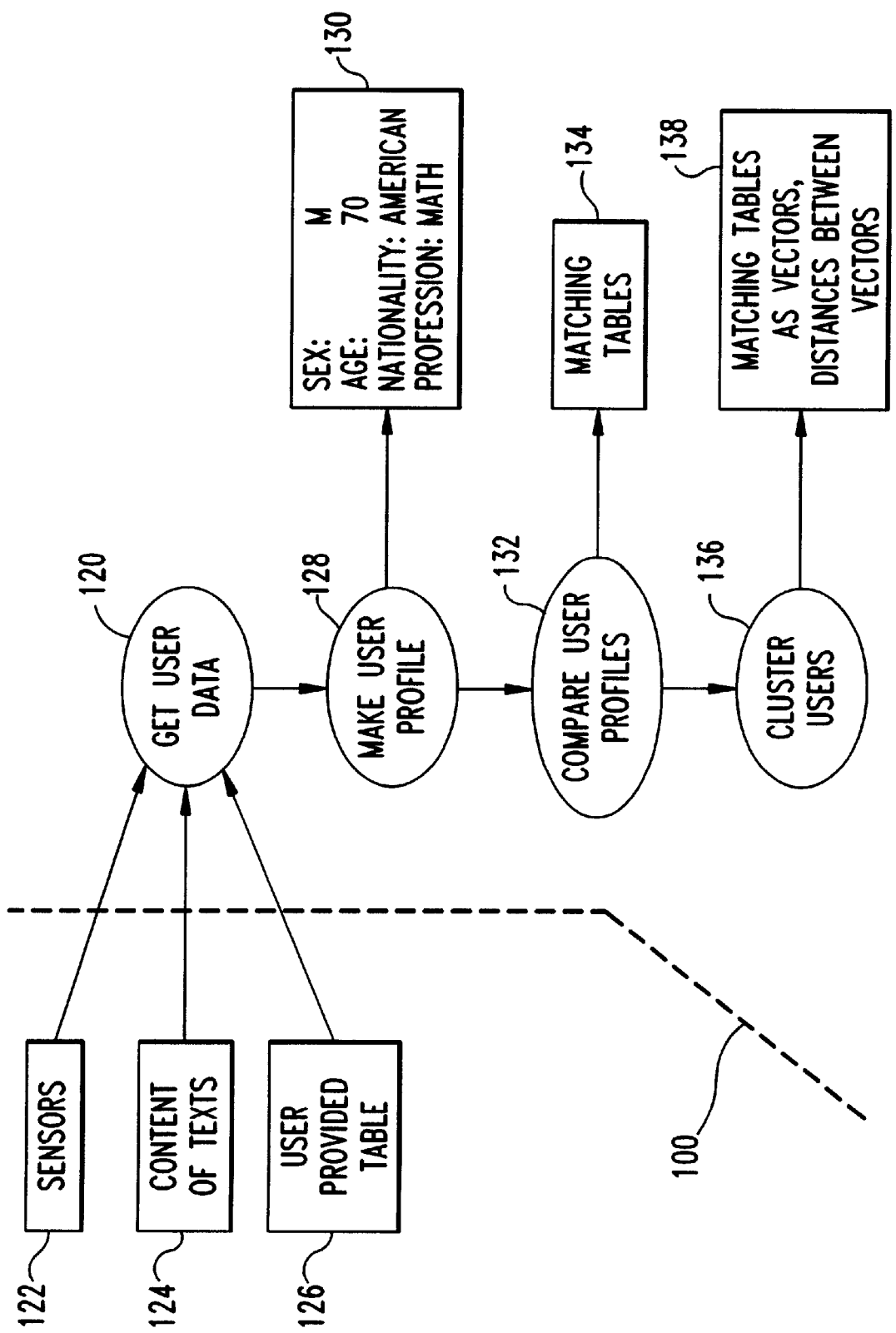
FIG. 2 is a flow chart showing how users are clustered to accomplish the cooperative language recognition system according to the present invention.

FIG. 2 is a flow chart showing how users are clustered to accomplish this cooperative language recognition system according to the present invention. User data is collected in step 120 over the network 100 from users, e.g., from sensors 122, from existing textual content 124 and/or from existing user tables 126. In step 128 the collected user data is converted to user profiles containing user specific characteristics as shown by the example 130. A typical user profile 130 can include for example the user's nationality, profession, sex, age, etc. Then in step 132, the user profiles are compared and as a result of that comparison, matching user characteristic tables 134 are generated. Individual user profiles 130 are represented as vectors, users are clustered in step 136 by determining the distance between profile vectors of matching tables 138.

Thus, network users having similar characteristics are clustered together according to their similarities. Documents created by the network users are also clustered according their similarities. Language models are adapted according to document similarities and according to common activities of similar users, and as the local language models are adapted, they are transmitted over the network 100. Further, user characteristics and database similarities are collected and distributed, interactively, over the network 100 as they are identified. By supplementing real time text or speech recognition with previously recognized text or speech, the language recognition context of an individual recognition system is extended, providing global context for the local recognition system. In addition the supplementary text or speech may include text or speech from the same document or recognition session. Also, explicit subject categories may be combined with language models from existing documents created by the user and by similar users on the network for additional supplemental text or speech data.

Further, analyzing documents to produce language models may include producing correlation statistics for words in different document types or categories. An automatic categorization process is used to group similar documents. Word frequencies counting is an example of a suitable automatic categorization process. The preferred automatic categorization process counts key word frequencies and, if the counted frequencies fall within some preselected range of each other for different documents, then, those analyzed documents may be topically categorized. So, for example, two documents with repeated occurrences of STOCK and MONEY, may be categorized as being related to finance. Another appropriate automatic categorization method, wherein statistical methods are used to define topics is described in U.S. patent application Ser. No. 09/124,075, entitled "Real Time Detection of Topical Changes and Topic Identification via Likelihood Based Methods," filed on Jul. 29, 1998 assigned to the assignee of the present invention and incorporated herein by reference. Yet another automatic characterization approach is to automatically extract user related information from special files located, for example, on the Internet (e.g. cookies) or personal data located on the user's PC. Typically, users requesting services are often required to fill in forms wherein personal information is provided and that requested information is stored, locally, on the user's PC.

Next, users explicitly label documents according to subject and type, referred to an explicit categorization process. The explicit categorization process may include categories that are idiosyncratic to the particular user or group of users, such as names of current projects. Data used for explicit categorization may include, for example, where the user is required to fill in personal information forms that may be transmitted, for example, over the internet. That personal information allows special programs, commonly referred to as special agents to monitor the user's textual data and provide relevant data to LMs residing in central servers. A user can fill in such forms when the user purchases an ASR or, as users connect to the ASR, e.g., across the internet. Thus, a service may be provided wherein users may provide personal data and, the provided user data may be employed to access textual data, for generating a LM.

Figure 3:
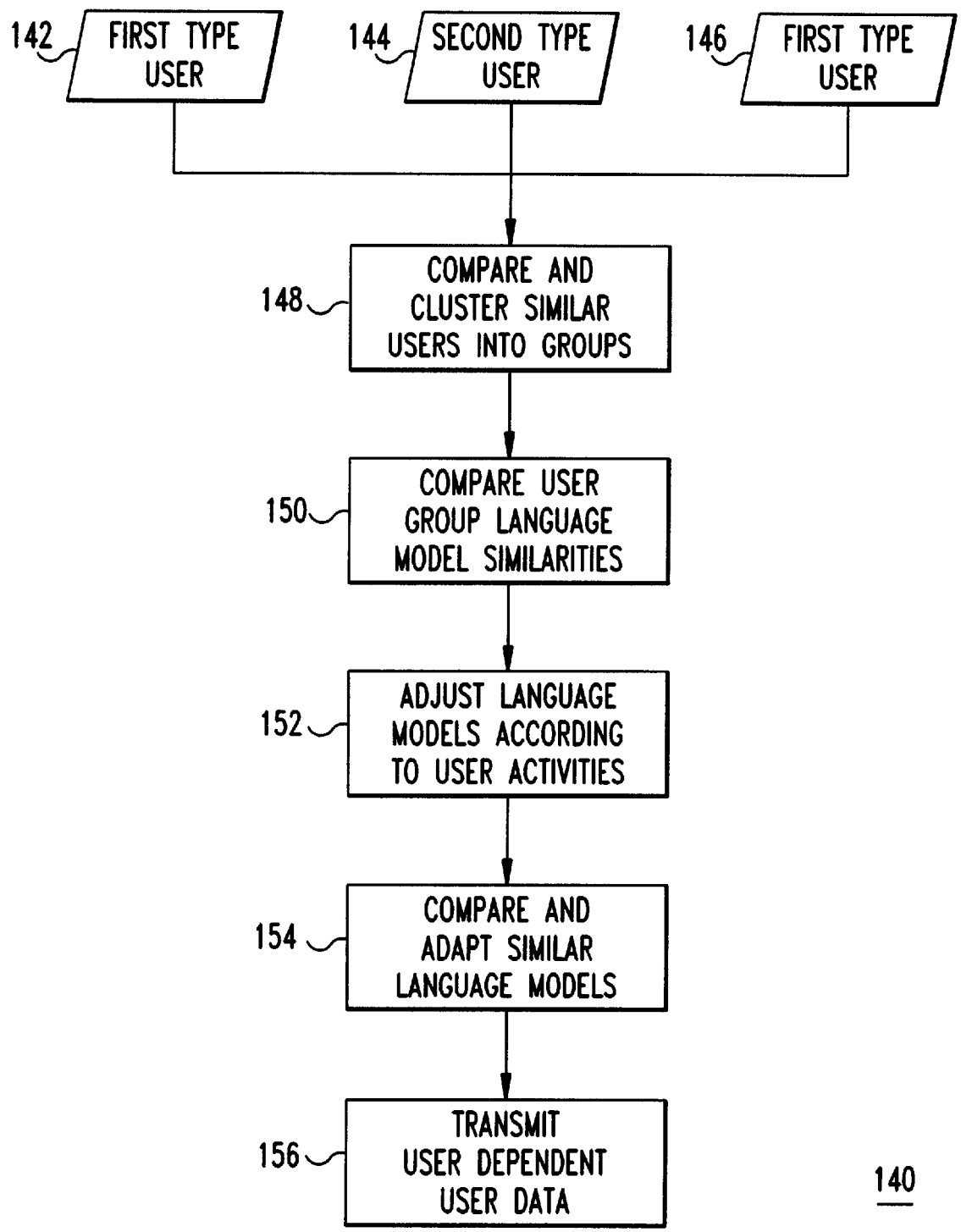
FIG. 3 is a flow chart of processes that operate over network.

FIG. 3 is a flow chart of the preferred recognition process 140 with different users providing input 142, 144, 146. So, first, in step 148 the network users 142, 144, 146 are compared and clustered into classes of similar users as described hereinbelow with reference to FIG. 4. Then, in step 150 language models in different user clusters are compared and similar language models are identified in each such user cluster. Next, in step 152 the language models in each cluster are modified relative to its user production or recognition activities. User language models may be adapted statistically such as is described, for example, in Chapter 14 of "Statistical Methods for Speech Recognition" by Frederick Jelinek, The MIT Press, Cambridge, 1998. Jelinek teaches how LM may be adapted in real time speech recognizers. Essentially, as taught by Jelinek, probabilities of words, bigrams and trigrams in the model are changed in accordance with words, bigrams and trigrams encountered in the text. Also, vocabularies are adapted (words are added or removed) depending on textual data processed. Language models can be identified as similar by comparing several characteristics. The simplest such characteristic comparison is to compute what is known as and what Jelinek refers to as text "perplexity" for the different LMs. If LMs exhibit close perplexities, they are taken as similar.

Next, in step 154, whenever any of the individual language models are modified in the course of users production activities, all similar language models from different clusters are compared and adapted. As used herein, user production activities refers to, generally, speech or audio related activities that are intended to produce specific computer related responses. Thus, user related activities includes activities such as dictation, conversation, error correction and generation of sounds including noise and music. In step 156, user data is transmitted over the network 100 from local computers, e.g., PC 104 or PDA 102. This user data may include general data about users, information about user activities and user language model data. Initially, user data is transmitted over the network 100 to a server 108, which performs user clustering and LM adaptation. It should be noted that in this sense, step 156 is executed, initially, prior to executing step 148. Every computer user 142, 144, 146 registered for using adaptation receives the address of the central server 108. All user data is transmitted, periodically, to this central server 108 for evaluation and LM adaptation.

Then, after LM adaptation and user clustering, in step 156, the modified user data is transmitted back to local users from the central server 108. Thus, when user LMs are adapted, they are transmitted from the central server 108 to replace the old LM on the local user's PC 102 or 104. Optionally, to reduce network 100 load and avoid overload from all data going into one server 108 multiple central servers 108 may be included on the network. Then, after users are initially clustered, one or more central servers 108 may be identified for performing LM adaptation for a particular cluster of users. Thus, there may be several servers 108 with each user having the address of one central server 108 that performs LM adaptation for that user's cluster.

Also, LMs may be adapted locally, especially if there is small number of users in a cluster or, if the users typically produce minimal textual data such that each user's computer is not overloaded. In this second optional approach, after users are clustered, clustered users directly provide each other with changes to textual data whenever the data is changed. As changes are received, the local LM is adapted. This local adaptation approach may be used instead of or, in combination with, the above described preferred global LM adaptation. So, changed textual data of users from one cluster being transmitted to the server 108 may be provided simultaneously to other users in the same cluster. Upon receiving the changed textual data, the server 108 may, for example, filter the data to clean it for garbage words (e.g., deleting \*\*\*), execute what is normally referred to as "tokenizing" the text to place words into a standard form (e.g., changing "1" to "one" or "," into "coma"), produce word counts or bigram counts, etc. Then, the server 108 operation results are sent to local computers 102, 104, 106 for local LM adaptation.

Figure 4:
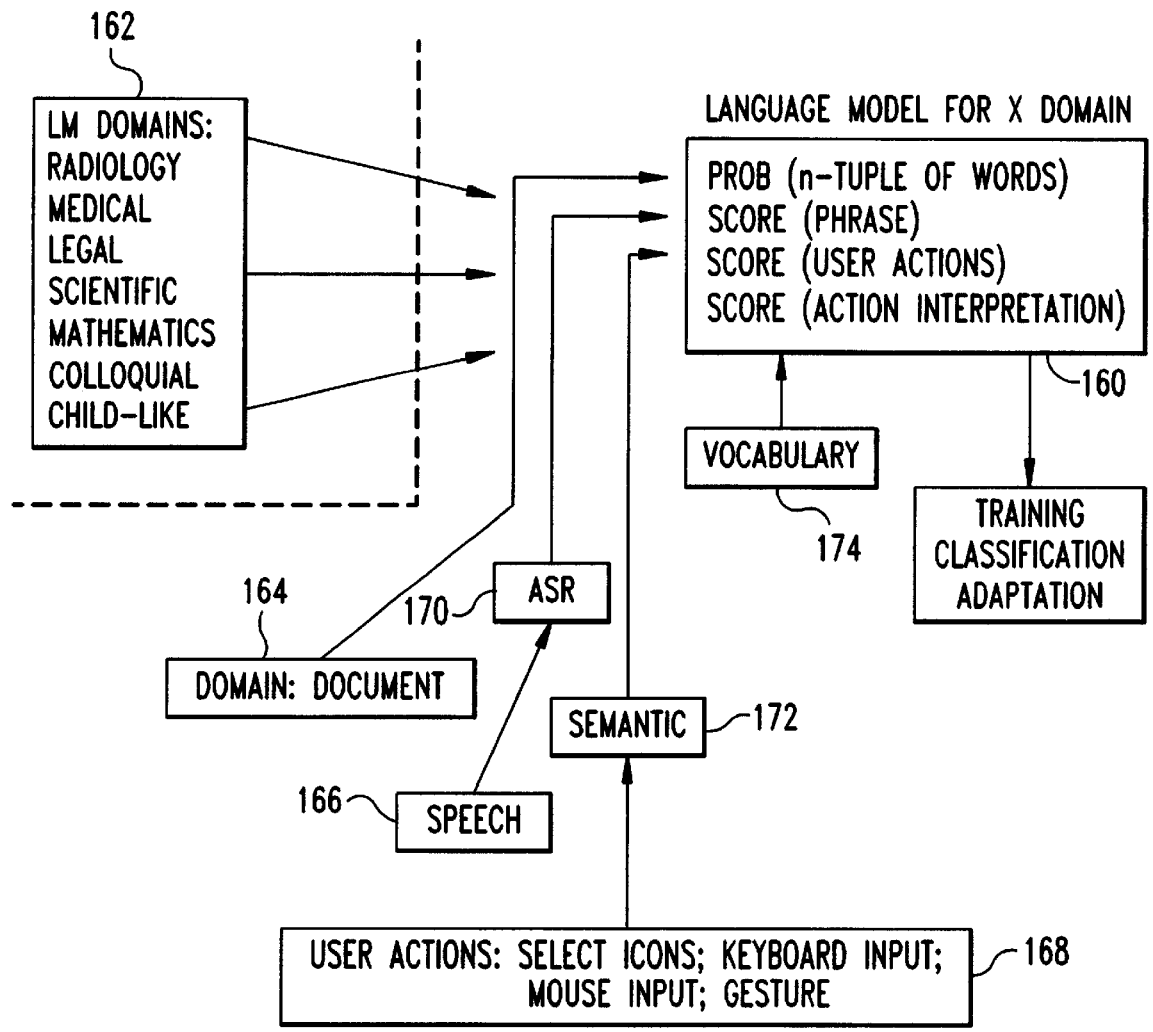
FIG. 4 is an illustration of a language model and sets of language models for one user.

FIG. 4 illustrates a language model 160 and sets of language models for one user. The user based set of language models may include language models that cover different domains 162, each of which includes words, phrases, idioms, etc., that are specifically related to the particular subject of that domain. For example, the language model domains 162 may include medical, radiology, legal, scientific, fields in the science (mathematics, physics, etc.), colloquial or everyday language, newspapers, and child-like communication domains or any other language domain characterized by vocabulary and grammar. Further, each language model 160 may be a set of probabilities attached to words or n-tuples of words from a vocabulary, a mixture of sets of probabilities attached to n-tuple of words from a vocabulary, a set of scores attached to phrases, a set of scores attached to user action sequence interpretations or a set of scores attached to interpretations of sequence combinations of user actions of different modalities. The different modalities may include words, gestures, mouse actions, keyboard actions and actions on displays.

So, as a user inputs a document 164, dictates 166 or uses some type of manual input 168, the LM domain 162 is identified for that user and the input is passed to the proper LM 160 for the identified domain 162. Thus, scanned documents 164 are passed directly to the LM 160. Verbal user input or, dictation 166, must be converted to text using automatic speech recognition 170, for example. Manual input 168 may include striking a keyboard key, touching an icon displayed on a touch screen display, moving a mouse, writing on handwriting pad or gesture input received by a video camera. Manual inputs 168 are passed through a semantic interpreter 172 which interprets user goals. Semantic interpreters are well known and may be, for example, such as described by W. Lehnert et al. in "BORIS—An Experiment In-Depth Understanding Narratives," *Artificial Intelligence*, 120(1) January 1983, pp. 15–62 or, as described in "The Design and Implementation of the TRAINS-96 System: A Prototype Mixed-Initiative Planning Assistant" TRAINS Technical Note 96-5, http://www.cs.rochester.edu/research/trains/home.htm For each type of recognition to be enabled, whether speech recognition, handwriting recognition or machine translation, LMs must be included. Typically, each LM is provided with an initial vocabulary 174 that is supplemented or modified as recognition proceeds. Normally, training 176 is done to provide a baseline for various model functions such as for estimating word n-tuple probabilities from textual data and for estimating user action scores from user action databases.

Figure 5:
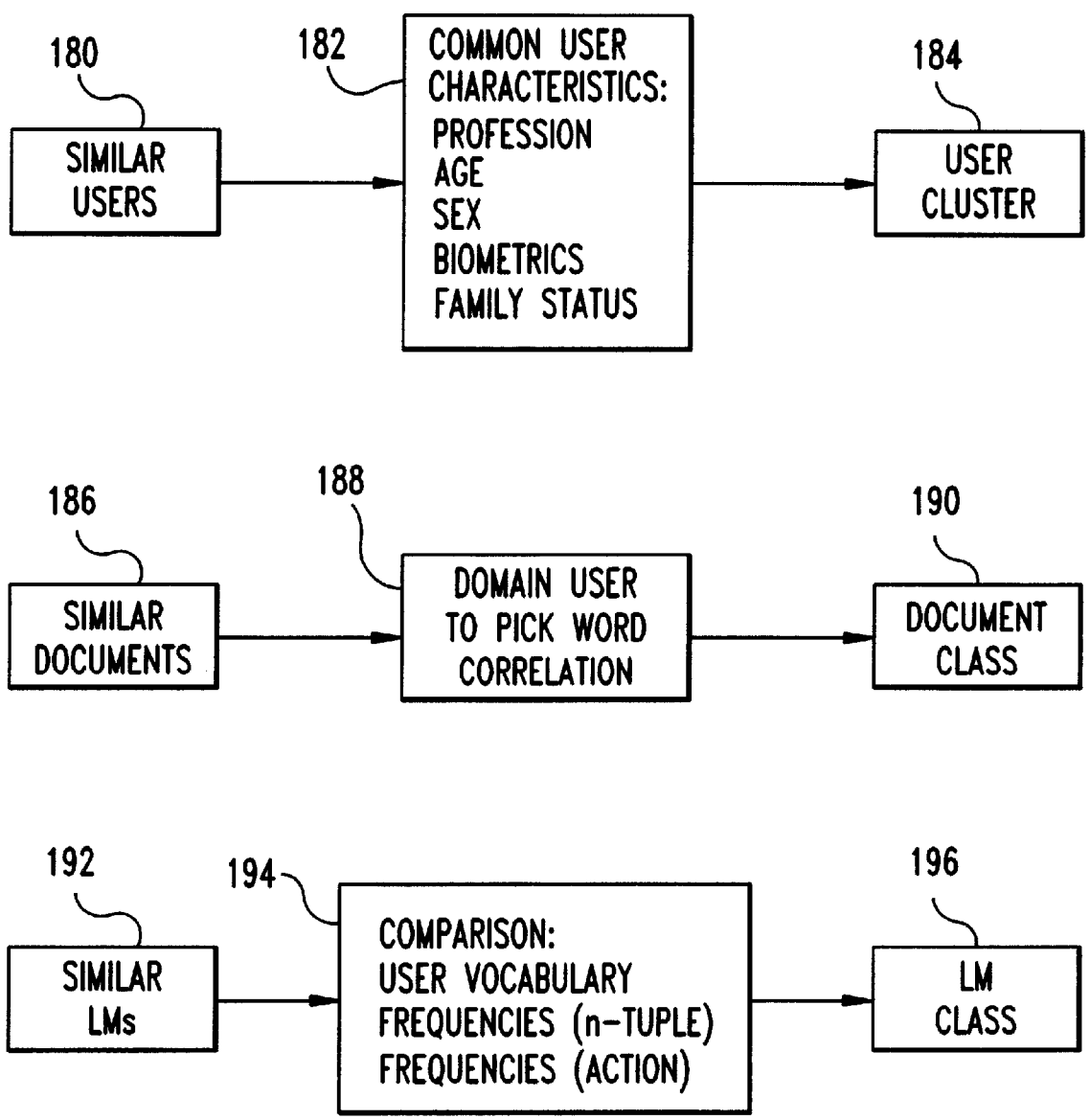
FIG. 5 is illustrates clustering users, documents and LMs across the network according to the present invention.

FIG. 5 illustrates clustering users, documents and LMs by the preferred system across the network according to the present invention. Thus, similar users 180 are clustered according to user characteristic 182 similarities into user clusters 184. Common user characteristics 182 may include, for example, the user's profession, age or sex, a tendency to lisp, a proclivity towards strong or obscene language. Also, user biometrics, activities, social connections, knowledge, family status, family membership, group membership and genotype or any measurable physical or mental characteristic may be considered. The above recited characteristics are for example only and not intended as a limitation.

Depending upon the number of common characteristics found, users having one or more similar such characteristics in common are grouped into corresponding classes. Also, similar documents 186 are clustered according to user selected criteria 188, e.g., pick word correlation, into document classes 190. For each domain, similar LMs 192 are clustered according to comparable functions 194 into LM classes 196. Language model clustering may include: comparing active user vocabularies, comparing vocabulary word frequency, comparing n-tuple of word use frequency, comparing similar user action sequence scores; applying mathematical transformations to scores, word sequence or action probabilities; and comparing results.

As user recognition progresses for a particular user, similar language models are modified for one or more users. Thus, words may be added to LM vocabularies or, infrequently, used or unused words may be removed from a particular domain's LM. Word frequencies for words that are used by one user cluster may be changed. Frequencies of word n-tuples that occurred in user activities may be changed. Thus, if a word or word n-tuple occurs more or less frequently than was originally anticipated, then the anticipated probability of the word is adjusted. Repetitive action sequences, that for other applications might be recorded as a macro and replayed, instead are scored according to frequency of sequence occurrence and likelihood of intended result. Action sequence scores may be changed to reflect current user activities and the corresponding user intended meaning or response. Probabilities and action or word sequence scores may be transformed mathematically to reflect user activities during a selected recognition period.

Further, the mathematical transformation applied to the sequence scores may be a linear mixture of sets old language model scores or probabilities in combination with new scores recorded during current user activity or, something much more complex. The language model scores may be adapted using, for example, the methods described in Jelinek, or "Statistical Language Learning," Eugene Charniak, The MIT Press, Cambridge, 1996. Alternately, statistical models may be used to interpret and adjust data in real time. Further, language model parameters may be adapted based on newly recorded user activity data. An appropriate such statistical method for analyzing data and defining textual classification changes (e.g., identifying topic changes or beginning a new topic) is described in U.S. patent application Ser. No. 09/124,075.

So, for example, if a user's dictation subject is weather, then, related data from other users can be used to adapt the dictating user's LM. Also, the preferred system can detect in real time when a user changes topics and therefore, that data currently being recorded should not be used for the same adaptation. Thus, for a user switching topics from weather to a previously undiscussed topic, e.g., sports, a new LM topic is established and made available for use by other users.

While the invention has been described in terms of preferred embodiments, those skilled in the art will recognize that the invention can be practiced with modification within the spirit and scope of the appended claims.

We Claim:

1. A language recognition system for recognizing language based input from computers connected together over a network, each computer including at least one user based language model trained for a particular user, said system comprising:
   means for clusterng language models located on ones of a network of computers into classes according to similar users;
   means for identifying similar language models among said clustered language models;
   means for modifying said language models responsive to user production activities;
   means for comparing identified similar language models and adapting all of said identified similar language models responsive to modification of one or more of said similar language models; and
   means for transmitting user data over said network, said user data including information about said user production activities and user language model data.

2. A language recognition system as in claim 1, further comprising:
   means for identifying at least one language model domain, similar language models being clustered according to identified language model domains.

3. A language recognition system as in claim 2, wherein at least one of said plurality of connected computers includes language models from two or more different domains.

4. A language recognition system as in claim 2, wherein said language model domain identification means comprises:
   means for identifying a medical language domain, a radiological language domain, a legal phrase domain, a scientific language domain, a colloquial language domain, and a child-like language domain.

5. A language recognition system as in claim 2, further comprising:
   input means for receiving input from one or more connected said computer.

6. A language recognition system as in claim 5, wherein at least one type of said similar language models is located on a first computer and said input is from a second computer, said at least one type of similar language models being responsive to said input on said second computer.

7. A language recognition system as in claim 5, wherein at least one type of said similar language models is a probability set for a plurality of n-tuples of words and said means for modifying said at least one type of similar language model includes means for calculating a new probability set based on said input.

8. A language recognition system as in claim 5, wherein at least one type of said similar language model is a plurality of probability sets, each of said probability sets including probabilities for a plurality of n-tuples of words and, said means for modifying said at least one type of similar language model includes means for calculating a new probability set based on said input.

9. A language recognition system as in claim 5, wherein at least one type of said similar language model is a set of scores corresponding to individual ones of a plurality of phrases and said means for modifying said at least one type of similar language model includes means for calculating a new score set based on said input.

10. A language recognition system as in claim 5, wherein at least one type of said language model is a set of scores corresponding to interpretations of action sequences and said means for modifying said at least one type includes means for calculating a new score set based on said input.

11. A language recognition system as in claim 5, wherein said input means comprises means for manually inputting language.

12. A language recognition system as in claim 11, wherein said manual input means includes a keyboard, a mouse, a touch screen display and a handwriting pad.

13. A language recognition system as in claim 5, wherein said input means comprises means for verbally inputting language.

14. A language recognition system as in claim 1, wherein said means for clustering language models comprises means for identifying common characteristics of users.

15. A language recognition system as in claim 14, wherein identified said common characteristics are selected from the group including each of said computer users' profession, age, sex, biometrics, activities, social connections, knowledge, family status, family membership, group membership and genotype.

16. A language recognition system as in claim 15, wherein said means for identifying common characteristics comprises means for asking each new user a set of characteristic related questions.

17. A language recognition system as in claim 16, wherein language models are clustered by said means for clustering language models such that language models for users having at least one common characteristic are clustered into a class.

18. A language recognition system as in claim 1, further comprising;
   means for receiving an adapted language model transmitted from another computer on said network.

19. A language recognition system as in claim 1, wherein the network of computers comprises:
   at least one server;
   at least one personal computer;
   at least one hand held computer; and
   at least one embedded computer.

20. A language recognition method for recognizing language from each of a plurality of computer users, said computer users using computers coupled together over a network, said method comprising the steps of:
   clustering users into classes of similar users;
   identifying similar language models among language models of similar users;
   modifying a language model of one clustered user responsive to user production activities;

comparing identified similar language models and adapting all said identified similar language models responsive to modification of said language model; and transmitting user data over said network, said user data including information about user activities and user language model data.

21. A language recognition method as in claim 20, wherein the step of comparing similar language models comprises the steps of:

comparing active user vocabularies;

comparing frequencies of use of words from vocabularies;

comparing frequencies of use of n-tuple of words;

comparing scores of similar sequences of user actions; and comparing results of mathematical transformations.

22. A language recognition method as in claim 21, wherein the mathematical transformations are applied to recognition scores.

23. A language recognition method as in claim 22, wherein the recognition scores comprise word probabilities, word sequence probabilities and action sequence probabilities.

24. A language recognition method as in claim 20, wherein the step of modifying similar language models comprises the steps of:

adding new words to language model vocabularies;

removing unused words from language model vocabularies;

changing word frequencies for words responsive to use by at least one user;

changing n-tuples word frequencies responsive to use by at least one user;

changing action sequence scores responsive to use by at least one user; and transforming probabilities and scores for word and action sequences responsive to use by at least one user.

25. A language recognition method as in claim 24, wherein the step of transforming probabilities comprises:

adapting language model scores responsive to user activities;

linearly combining language model score sets with a set of language model scores generated responsive to user activities;

linearly combining language model probability sets with a set of language model probabilities generated responsive to user activities; and interpolating language model statistical data responsive to user activities.

26. A language recognition method as in claim 22, wherein the step of identifying similar language models comprises:

identifying a language model domain, similar language models being clustered according to said identified domain.

27. A language recognition method as in claim 22, wherein the step of clustering similar users comprises:

identifying users having a plurality of common characteristics.

28. A language recognition method as in claim 22, wherein during the step of transmitting data, data is transmitted to other users within the same cluster.

29. A computer program product for recognizing language from each of a plurality of computer users, said computer users using computers coupled together over a network, said computer program product comprising a computer usable medium having computer readable program code thereon, said computer readable program code comprising:

computer readable program code means for clustering users into classes of similar users;

computer readable program code means for identifying similar language models among language models of similar users;

computer readable program code means for modifying a language model of one clustered user responsive to user production activities;

computer readable program code means for comparing identified similar language models and adapting all said identified similar language models responsive to modification of said language model; and computer readable program code means for transmitting user data over said network, said user data including information about user activities and user language model data.

30. A computer program product as in claim 29, wherein the computer readable program code means for comparing similar language models comprises:

computer readable program code means for comparing active user vocabularies;

computer readable program code means for comparing frequencies of use of words from vocabularies;

computer readable program code means for comparing frequencies of use of n-tuple of words;

computer readable program code means for comparing scores of similar sequences of user actions; and computer readable program code means for comparing results mathematical transformations.

31. A computer program product as in claim 29, wherein the computer readable program code means for modifying similar language models comprises:

computer readable program code means for adding new words to language model vocabularies;

computer readable program code means for removing unused words from language model vocabularies;

computer readable program code means for changing word frequencies for words responsive to use by at least one user;

computer readable program code means for changing n-tuple word frequencies responsive to use by at least one user;

computer readable program code means for changing action sequence scores responsive to use by at least one user; and computer readable program code means for transforming probabilities and scores for word and action sequences responsive to use by at least one user.

32. A computer program product as in claim 31, wherein computer readable program code means for transforming probabilities comprises:

computer readable program code means for adapting language model scores responsive to user activities;

computer readable program code means for linearly combining language model score sets with a set of language model scores generated responsive to user activities;

computer readable program code means for linearly combining language model probability sets with a set of language model probabilities generated responsive to user activities; and computer readable program code means for interpolating language model statistical data responsive to user activities.

33. A computer program product as in claim 29, wherein the computer readable program code means for identifying similar language models comprises:

computer readable program code means for identifying a language model domain, similar language models being clustered according to said identified domain.

34. A computer program product as in claim 29, wherein the computer readable program code means for clustering similar users comprises:

computer readable program code means for identifying users having a plurality of common characteristics.

35. A computer program product as in claim 29, wherein the computer readable program code means for transmitting data, transmits data to other users within the same cluster.

* * * * *